(No Model.)
J. J. WILLIAMS.
WAGON JACK.
No. 338,626. Patented Mar. 23, 1886.
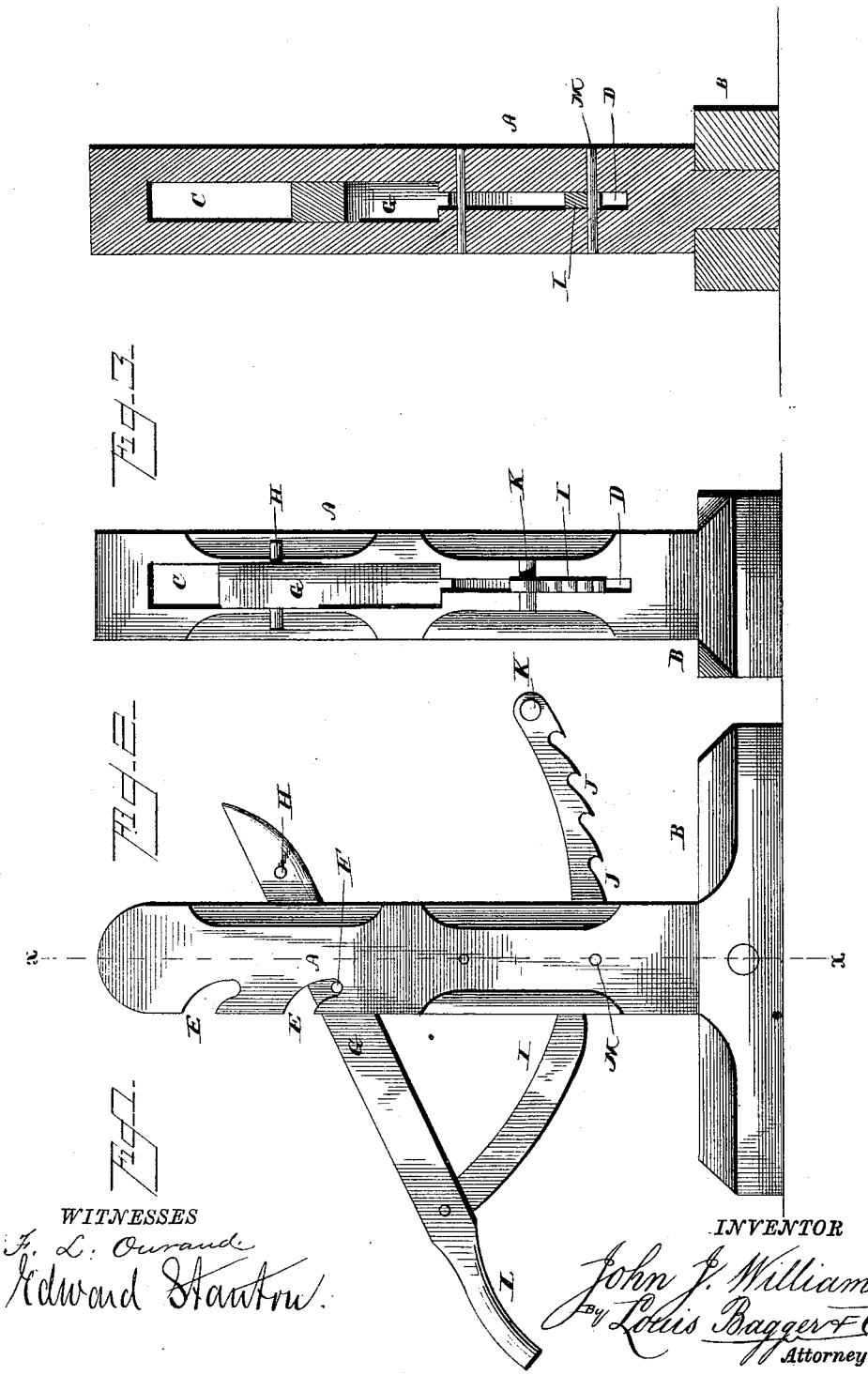
WITNESSES
F. L. Ourand
Edward Stanton
INVENTOR
John J. Williams
By Louis Bagger & Co.
Attorneys.

UNITED STATES PATENT OFFICE.

JOHN J. WILLIAMS, OF VERNON, MICHIGAN.

WAGON-JACK.

SPECIFICATION forming part of Letters Patent No. 338,626, dated March 23, 1886.

Application filed October 12, 1885. Serial No. 179,573. (No model.)

*To all whom it may concern:*

Be it known that I, JOHN J. WILLIAMS, of Vernon, in the county of Shiawassee and State of Michigan, have invented certain new and useful Improvements in Wagon-Jacks; and I do hereby declare that the following is a full, clear, and exact description of the invention, which will enable others skilled in the art to which it appertains to make and use the same, reference being had to the accompanying drawings, which form a part of this specification, and in which—

Figure 1 is a side view of my improved wagon-jack. Fig. 2 is a front view of the same, and Fig. 3 is a vertical section on line $x$ $x$, Fig. 1.

Similar letters of reference indicate corresponding parts in all the figures.

My invention has relation to that class of wagon-jacks in which the lifting-lever may rest with a transverse pin or bolt in notches upon the rear side of the upright, and in which the outer end of the lifting-lever is provided with a notched bar hinged to it, which engages a transverse pin in a recess or slot in the upright, through which slot the bar passes; and it consists in the detailed construction and combination of parts of such a wagon-jack, as hereinafter more fully described and claimed.

In the accompanying drawings, the letter A indicates the upright of the jack, which is mounted upon a base, B, and this upright is formed with a vertical slot or recess, the upper portion, C, of which is wider than the lower portion, D, which is a narrow slot. The rear side of the upright is formed with downwardly-curved notches E, and the transverse fulcrum-bolt F of the lifting-lever G rests in these notches and projects with its forward short end through the wider portion of the vertical slot in the upright, and is provided near the forward end with a transverse bolt or pin, H, which will prevent the lever from being drawn out of the slot to the rear of the upright.

A flat bar, I, having notches J upon its lower edge, having a slight upward curve and provided at its forward end with a transverse head, K, slides in the narrow portion of the vertical slot or recess, and is pivoted to the lifting-lever near its rear end, at the place where the handle L of the lever begins, and the notches of this notched bar may engage a transverse bolt, M, at the lower end of the narrow portion of the vertical slot.

It will now be seen that as the fulcrum-pin of the lifting-lever is placed in the notches upon the rear side of the upright, the pin being placed in notches at a convenient height to suit the height of the axle above the ground, the forward end of the lever is placed under the axle to be lifted and the rear end of the lever depressed until the axle is raised sufficiently, when a notch upon the curved notched bar will engage the transverse pin in the lower end of the narrow portion of the vertical slot and hold the said bar, and through it the lifting-lever.

The transverse pin in the forward end of the lifting-lever will prevent the lever from being drawn rearward out of the recess in the upright when shifting the fulcrum-pin from one notch to another.

By having the vertical recess or slot formed with a wider upper portion and a narrow lower portion the lifting-lever may rock and slide up and down in the wider portion, while the notched guide-bar will slide in the narrow portion and be confined from all lateral play, the sides of the bar bearing against the sides of the slot.

The jack is very simple of construction, strong and durable when made of the proper materials, and easily operated, without liability to get out of order.

Having thus described my invention, I claim and desire to secure by Letters Patent of the United States—

1. In a wagon-jack, the combination of an upright having a vertical slot formed with a wider upper portion and a narrow lower portion and having notches upon its rear side, a lifting-lever resting with its fulcrum-pin in the notches and projecting through the wider portion of the slot, and a notched guide-bar passing through the lower narrow part of the vertical slot and pivoted to the rear portion of the lifting-lever and engaging a transverse pin in the upright, as and for the purpose shown and set forth.

2. In a wagon-jack, the combination of an upright having a vertical slot wider in its upper end and narrow in its lower end and having a series of notches upon its rear side and a transverse pin passing through the lower narrow end of the vertical slot, a lifting-lever projecting through the wide portion of the slot and having a transverse fulcrum-pin resting in the notches and a transverse stop-pin through its forward end, and a curved flat bar pivoted at its rear end to the rear portion of the lever, having a transverse head at its forward end and having its lower end notched and engaging the transverse pin in the narrow portion of the vertical slot, the said notched bar passing through the said narrow portion, as and for the purpose shown and set forth.

In testimony that I claim the foregoing as my own I have hereunto affixed my signature in presence of two witnesses.

JOHN J. WILLIAMS.

Witnesses:
GEORGE F. BROWN,
JOHN DONELSON.